Nov. 16, 1926.
D. C. DAVIS
1,607,390
THRUST COLLAR EQUALIZATION
Filed Oct. 6, 1922
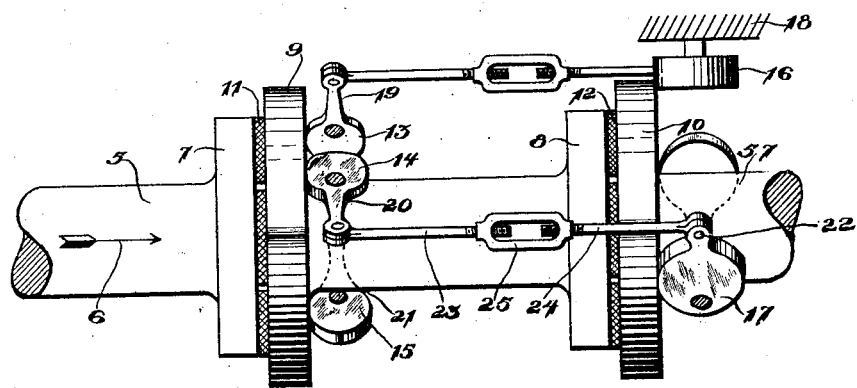
INVENTOR
David C. Davis
WITNESSES:
W. S. Beckley.

Patented Nov. 16, 1926.

1,607,390

UNITED STATES PATENT OFFICE.

DAVID C. DAVIS, OF CHESTER, PENNSYLVANIA, ASSIGNOR TO WESTINGHOUSE ELECTRIC AND MANUFACTURING COMPANY, A CORPORATION OF PENNSYLVANIA.

THRUST-COLLAR EQUALIZATION.

Application filed October 6, 1922. Serial No. 592,882.

My invention relates to thrust-equalizing or distributing means for thrust bearings of the multiple-collar type and it has for its object to provide apparatus of the character designated which shall be simple, compact, inexpensive and highly effective to perform the desired function.

The single figure of the accompanying drawing is a side view, partially in section, of a device constructed in accordance with my invention.

In the operation of large thrust bearings, as are commonly employed, for example, on the propeller shafts of ships, it is found difficult or impossible to impose the entire thrust upon a single thrust collar and accordingly, means have been proposed for distributing this thrust among a plurality of thrust-receiving collars. Apparatus of this character has been open to the objection that it has hitherto been found extremely difficult to properly divide the load among the respective collars, elaborate system of equalizing levers having been proposed but not proving successful in all cases.

In accordance with the present invention I provide, for example, two substantially fixed thrust-receiving collars and the thrusts assumed thereby are carried by cams so disposed that said cams tend to rotate. I then interconnect a cam of one collar with a cam of the other collar in such a manner that said rotative tendencies are caused to oppose each other, and by this means, I am enabled to automatically adjust the respective thrust loads in any desired manner.

Referring to the drawing for a more detailed understanding of my invention, I show a shaft at 5—5 having a thrust in the direction indicated by an arrow 6. Suitable flanges 7 and 8 are carried by the shaft 5 and substantially fixed thrust-receiving collars 9 and 10 are suitably positioned thereagainst to receive thrust therefrom.

I have shown tilting blocks of the well-known Kingsbury type at 11 and 12 for transmitting the thrust to the fixed collars but this is not an essential detail of my invention.

Suitable cams 13, 14 and 15 are positioned behind the collar 9 and each of these cams has a fixed pivot as indicated, for finally assuming the thrust load. Similarly, the collar 10 rests against cams 16 and 17 and one not shown and the pivotal support of the cam 16 is more clearly indicated at 18. While, for clearness, I have not shown all the pivot supports, it should be understood that they are sufficiently rugged and sufficiently attached to adjacent rigid structure as to assume all the thrust load.

As shown, the cams 13, 14 and 15 are provided with arms 19, 20 and 21 extending from the side of minimum eccentricity, whereas the cams 16 and 17 are provided with attachment lugs opposite their points of maximum eccentricity as indicated at 22 on the cam 17. A linkage joins the lug 22 with the end of the arm 20 and comprises members 23 and 24 joined by a turnbuckle or other adjusting device 25.

From the foregoing description the operation of this device will be obvious to those skilled in the art: Assuming the thrust on the collar 9 exceeds that on the collar 10, the cam 14 is rotated slightly in one direction so as to shorten the moment arm of the force applied thereto with respect to the pivot. This action produces tension in the linkage 23—25—24 and so rotates the cam 17 in an opposite direction as to slightly increase the radius of the applied force, so as to tend to move the collar 10 slightly toward the left, causing it to assume a greater share of the total thrust. Similarly, the reverse action takes place if the thrust on the collar 10 exceeds that on the collar 9.

While, in many cases it is preferable to employ but three sets of cams, as illustrated, because of their action in suitably distributing the equalizing work in accordance with the well-known principle of the three point suspension, nevertheless I may, if desired, employ any desired greater number of cam sets.

By the adjustment of the turn-buckle 25, the effective moment arm at the point of equilibrium may be adjusted so that the equalizing force in the linkage 23—24—25 may be adjusted in magnitude.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a multiple-collar thrust bearing, the combination with a pair of substantially fixed thrust-receiving collars, of a group of cams behind one collar and bearing thereagainst, said cams being so pivoted that the action of thrust thereagainst tends to cause rotation thereof in one direction as viewed from the longitudinal axis of the bearing, a group of cams behind the other collar and bearing thereagainst, said cams being so pivoted that the action of thrust thereagainst tends to cause rotation thereof in an opposite direction as viewed from the longitudinal axis of said bearing, and a linkage from each cam of one group to an associated cam of the other group, respectively, whereby the torque of each cam is balanced against the torque of an associated cam and the torques assumed by said collars are equalized.

2. In a multiple-collar thrust bearing, the combination with a pair of substantially fixed thrust-receiving collars, of a group of cams behind one collar and bearing thereagainst, said cams being so pivoted that the action of thrust thereagainst tends to cause rotation thereof in one direction, a group of cams behind the other collar and bearing thereagainst, said cams being so pivoted that the action of thrust thereagainst tends to cause rotation thereof in an opposite direction, a linkage from each cam of one group to an associated cam of the other group, respectively, and means for adjusting the lengths of said linkages, whereby the torque of each cam is balanced against the torque of an associated cam and the torques assumed by said collars are equalized.

In testimony whereof, I have hereunto subscribed my name this 29 day of Sept., 1922.

DAVID C. DAVIS.